Nov. 8, 1927.

R. D. PIKE

REGENERATIVE FURNACE

Filed Oct. 11, 1922    2 Sheets-Sheet 1

1,648,191

Inventor
Robert D. Pike
By Dewey Strong,
Townsend and Loftus.

Attorneys

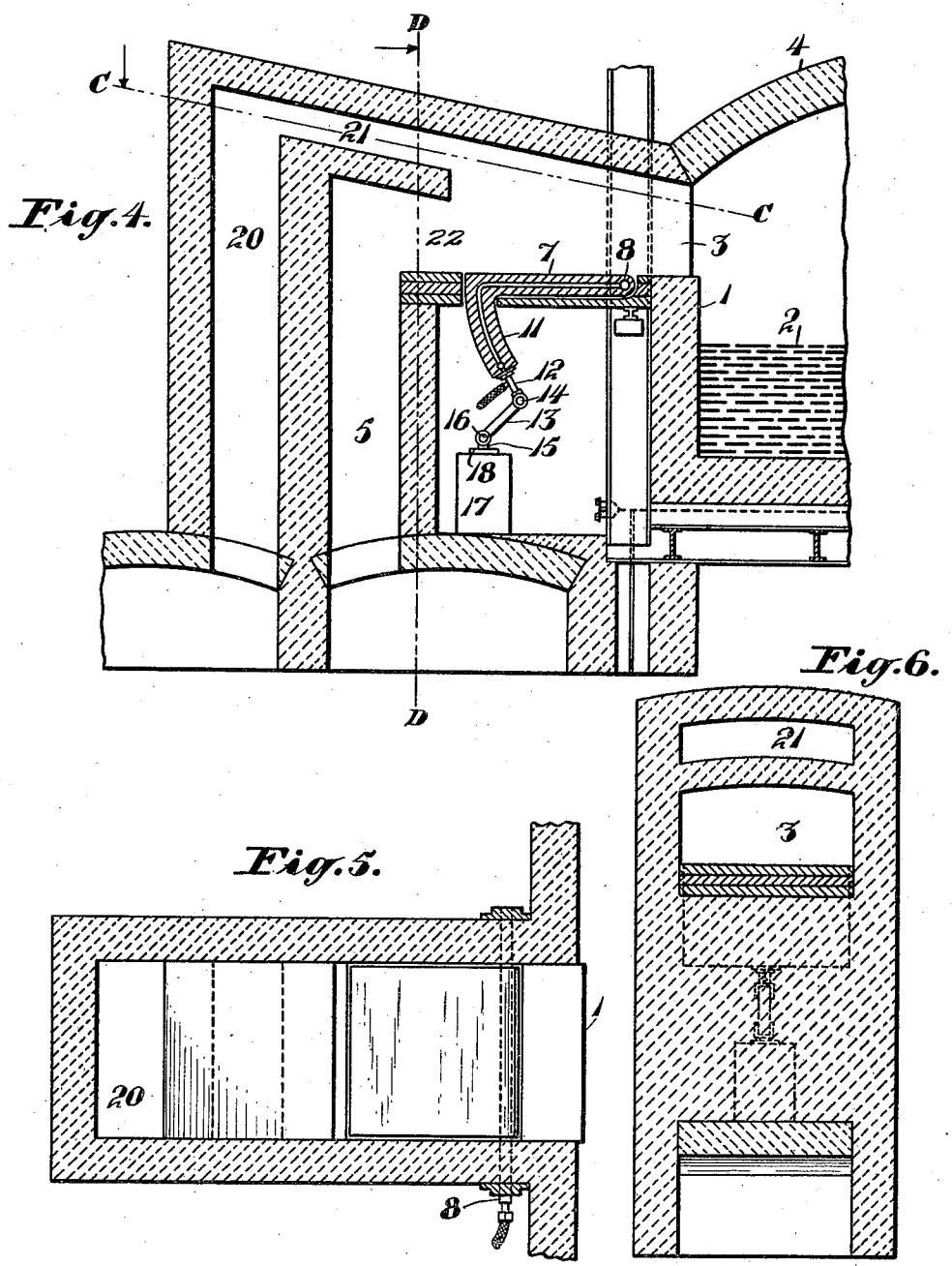

Patented Nov. 8, 1927.

1,648,191

UNITED STATES PATENT OFFICE.

ROBERT D. PIKE, OF SAN FRANCISCO, CALIFORNIA, ASSIGNOR TO COLE-FRENCH COMPANY, A CORPORATION.

REGENERATIVE FURNACE.

Application filed October 11, 1922. Serial No. 593,879.

This invention relates to regenerative furnaces, and more particularly to a glass tank furnace.

In the modern practice of melting steel in open hearth furnaces, ports have been adopted having a variable area. In one form of this port, the variable area is obtained by raising or lowering a water-cooled gate damper through the roof in the center of the throat of the port when the flame enters the furnace proper; or two such dampers through the roof on either side of the throat of the port. When the flame is issuing from the port, these dampers are lowered, thus restricting the area to about half of what it is when the dampers are raised. The air and gas pass through the restricted area under pressure at high velocity, which results in complete mixing of the gas and air, and therefore in a hot and fast combustion which is likened to the flame of a torch. On the other hand, when the hot gases are passing out through the port, the damper is raised, thus allowing ample area for the stack draft to relieve the furnace of the gases of combustion.

The same or similar effect is obtained in another type of port in which two auxiliary ports are provided for the air. When the port is being used for combustion, these auxiliary ports are completely closed by water-cooled valves of the mushroom type and all of the air for combustion is forced upwardly under pressure through a central air port, and, upon issuing from same, mixes with the gas also under pressure at high velocity, producing the desired early combustion or torch-like flame, upon which the value of the port of variable area depends. As in the first mentioned type, when the gases of combustion are passing through the port, the area is enlarged in this case by opening full the two auxiliary air ports, the mushroom valves being withdrawn into recesses provided for them which protect them to some extent from the hot gases.

The principle of early, quick, and therefore extremely hot or torch-like combustion is of value when applied to a wide range of melting furnaces, for example, to the glass tank furnace. But in the latter, there are usually from four to five ports of relatively small size in each side of the furnace through which the same number of flames play alternately at each reversal, instead of one large port at either end, as in the open hearth steel furnace. The wide distribution of the flame in the glass tank furnace is necessary because of reasons having to do with the fining of the glass and this distribution is obtained by the use of the said four or five ports on either side. But it will be obvious to anyone acquainted both with construction of the open hearth steel furnace ports and the several small glass tank furnace ports that neither of the variable area types of ports above described is applicable to the glass tank furnace as at present constructed without considerable modification and also without a great exposure of water-cooled dampers which will result in undue heat losses, which to some extent will defeat the object sought, namely, greater fuel economy.

The object of my present invention is, first, to provide a means of giving to the several ports of the glass tank furnace each a variable area independently regulated as to each port and in such a manner that the present gross area of the ports and lateral disposition of the flame can be maintained without unduly changing the construction of the ports or providing an excessive area of water-cooled surface, at the same time providing an expanding or Venturi-like channel; and accomplishing the object sought with the maximum degree of mechanical simplicity; providing a similar means for accomplishing the same object in the case of larger ports, such as are employed in the open hearth steel furnace, or such as are employed in glass tank furnaces of the kind described in my co-pending application, Serial No. 596,732, filed October 25, 1922, which, in their general make-up, have melting compartments similar to the open hearth steel furnace.

In the accompanying drawings I show one form of my invention applied to two different types of furnaces:

In Fig. 1 is shown a vertical section through the center line of one of the ports of a glass tank furnace of the so-called side-fired type at present in use equipped for burning oil or natural gas Fig. 2 is a section on the line A—A of Fig. 1.

Fig. 4 is a vertical section through the center of the port of the same type of furnace equipped for burning producer gas.

Fig. 5 is a section on the line C—C and Fig. 6 is a section on the line D—D.

Figure 1:
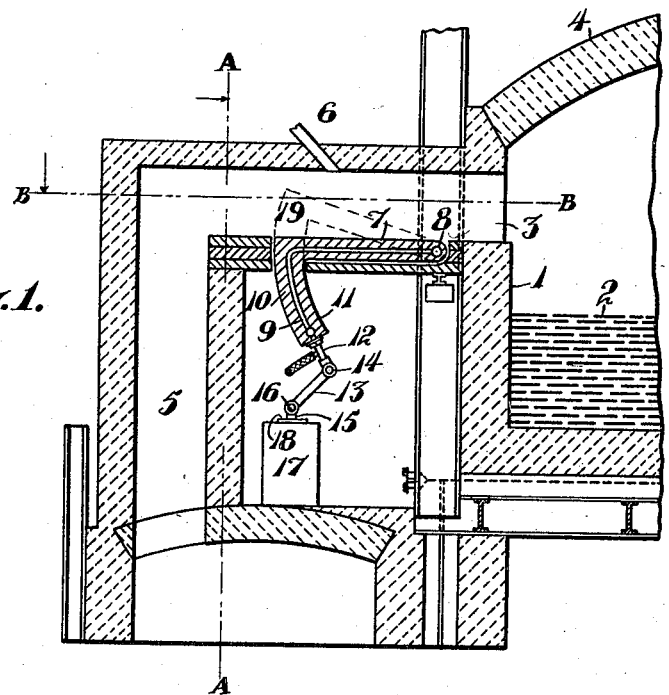
Figure 2:
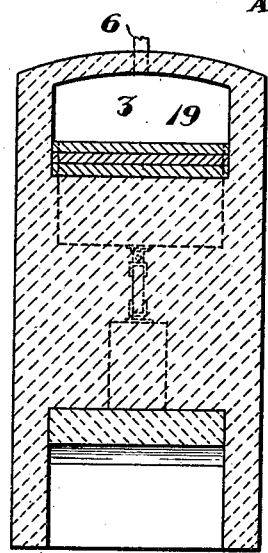
Figure 3:
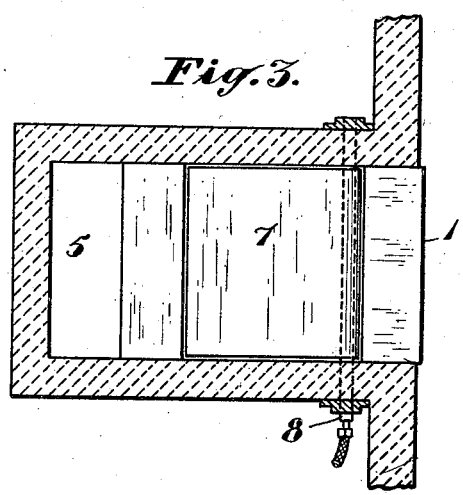
Fig. 3 is a section on the line B—B of Fig. 1.

Referring in detail to the drawings, the side wall of the furnace is indicated at 1 and the glass level at 2. 3 is the port and 4 is the roof of the furnace. A duct 5 connects the furnace hearth with a regenerator chamber, not shown. The furnace of Figs. 1 to 3 is provided with an oil or natural gas burner 6 of any suitable type. Within the port 3 is a pivoted flat damper 7 swinging on a water-cooled metal pivot or pin 8, and comprised of water-cooled metal framework 9 and refractory lining 10. The end of the damper farthest from the pin 8 has a segmental portion 11, which, in general shape, conforms to the segment of a cylinder having the pin 8 as a central axis. Rigidly attached to the lower end of the segmental portion 11 is a link 12 connected to a crank 13 through a pin 14. The crank 13 is attached to a piston rod 15 through a pin 16. The piston of the rod 15 operates in a hydraulic cylinder 17, by which an up and down motion of any desired magnitude may be imparted to the connected mechanism.

Ordinarily, when gases of combustion are flowing through the port 3, the flat part of the damper 7 is in a horizontal position, as shown in full lines, but the same can be held in any desired position in this phase of the furnace operation by means of a turnbuckle 18 or otherwise varying the travel of the piston within the cylinder 17. When the reversal period comes and the port is to be used for the flame, one valve causes the several hydraulic cylinders attached to the several dampers 7 on one side of the furnace to raise the latter to their predetermined positions for flame production, as indicated by the dotted lines. At the same time, the fuel is turned on in burners 6. It should be noted that the width of the damper 7 and its rigidly appended segment 11 is only slightly less than the width of the port 3, which latter has a rectangular cross-section, as shown in Fig. 2, so that when the damper 7 is raised to dotted position for flame production all of the air must pass through a restricted rectangular opening 19 at a high velocity, the necessary pressure for causing such velocity being partly furnished by the chimney effect of the regenerator and partly by a fan blower of any suitable type, not shown, and which may be attached to the incoming cold air port of the regenerator. The preheated air at high velocity meets the oil or gas projected across its path at high velocity and causes intimate mixture, the combustion beginning a little in front of the burner 6 as the sectional area of the port enlarges, resulting in an intensely hot flame being projected like a torch into the furnace and impinging therein on the molten glass, and causing melting thereof in a highly efficient manner.

When the damper 7 is moved upwardly to the dotted position shown, the cylindrical segment 11 passes through a slot which fits it as snugly as may be without actually causing frictional resistance to its motion.

It will be observed from the drawings that my invention may be easily applied to glass tank furnaces as at present constructed with very little change in construction; and, furthermore, that only one face of the damper 7 and segment 11 is exposed to the direct action of the hot gases and that on this account, the water-cooling effect is reduced to a minimum; and, furthermore, that although the upper or dotted position can be made the same for all dampers, the lower position can be varied, or vice versa. Thus, on the one hand, there is provided a delicate adjustment of the relative amount of hot gases of combustion passing through each port, and, on the other hand, an equally delicate adjustment of the amount of hot air admitted at each port so that the temperature from one end of the furnace to the other can be regulated at will.

The same numerals have been used to indicate corresponding parts in Figs. 4, 5 and 6. In this form the burner 6 is omitted and ducts 20 and 21 are provided for admitting producer gas to the port 3.

There is very little difference in the design of the port for using producer gas, as shown in Figs. 4, 5 and 6, except that no means is provided for regulating the flow of gas through the port 21, although a means of regulation could be provided, if desired. Heated air, when the port is on flame, comes up through duct 5 and passes at high velocity through a duct 22. The heated gas comes up through duct 20 and passes at high velocity through the duct 21. Air and gas mix thoroughly in the region indicated at 23, and expanding as they ignite, issue into the furnace through the port 3 in the form of an extremely hot flame projected toward the molten glass.

In a general way, the net area of each port on flame is about one-half of its total area when taking the gases of combustion from the furnace, but it is obvious that this relation can be varied over a considerable range.

It is obvious that in so far as the restriction in the area of the port is concerned, the same result would be obtained by merely thrusting up through the bottom of the port a water-cooled gate damper in a manner analogous to the above-mentioned practice in steel furnaces of lowering a like damper through the roof of a port, but such a method is inferior to the method which I have described for the following reasons:

(a) The preferred method provides an expanding or Venturi-like nozzle for the air and flame thus preserving the velocity head and transforming the same to pressure head.

(b) It provides a gradually expanding chamber which is suitable for the proper development of combustion.

(c) It gives to the incoming flame a deflection toward the hearth, even if the top of the port be horizontal, which insures fuel economy.

(d) It reduces water cooling effect, and provides a structure which will have a longer life.

While the construction shown and described herein is the preferred form of my invention, it is susceptible of considerable modification and variation, the essential requirement being a restricting damper arranged in the bottom of a port in a furnace of the regenerative type, as set forth in the appended claims.

Having thus described my invention, what I claim and desire to secure by Letters Patent is:—

1. In a regenerative furnace, a combustion and exhaust port leading to the furnace and a pivotally mounted damper in said port having an angular portion at its front end, said damper being movable to leave the port area larger for exhaust purposes than for combustion purposes and to form a passageway of gradually expanding cross-section for combustion purposes.

2. In a regenerative furnace, a combustion and exhaust port leading to the furnace, and a damper in said port pivotally mounted at its rear end and having an angular portion at its front end extending through a slot in the bottom wall of the port, said damper when lowered being adapted to lie in the plane of the bottom wall with the angular portion projecting below the same so as to leave the port unobstructed and when raised to form a restriction in the port of gradually expanding cross-section.

3. In a regenerative furnace, a combustion and exhaust port leading to the furnace, and a damper in said port having a horizontally disposed flat section pivotally mounted at its rear end and a vertically disposed curved section at its forward end, the latter working in a slot formed in the bottom wall of the port and means to move the free end of said damper from an obstructing position within the port to a position where the area of the port will be less restricted.

4. In a regenerative furnace, a combustion and exhaust port leading to the furnace, a damper in said port pivotally mounted at its rear end on the bottom wall of the port and having an angular portion at its forward end working in a slot in the bottom wall of the port and means operatively connected with the last-named end for raising and lowering the damper.

5. In a regenerative furnace, a combustion and exhaust port leading to the furnace, a damper pivotally mounted therein for varying the area of the same, means for moving said damper and adjustable connections between the means and the damper.

6. In a regenerative reversing furnace, a combustion and exhaust port leading to the furnace, a damper mounted in the bottom of said port and means for moving the damper so as to vary the area of said port.

7. In a regenerative reversing furnace, a combustion and exhaust port, a damper mounted in said port and movable into position to form a Venturi-like passageway having a variable angle of dispersion for combustion purposes.

8. In a regenerative reversing furnace, a combustion and exhaust port, a damper mounted in said port, said damper being movable to vary the shape of the port from one having comparatively straight sides to a Venturi-like passageway having a variable angle of dispersion.

ROBERT D. PIKE.